F. G. PERKINS, DEC'D.
G. S. PERKINS, EXECUTRIX.
GLUE SPREADER.
APPLICATION FILED MAR. 13, 1911.

1,198,655.

Patented Sept. 19, 1916.
8 SHEETS—SHEET 7.

Witnesses:
John O. Gempler
Geo. M. Harris

Frank G. Perkins, deceased, Inventor
by Gertrude S. Perkins, Executrix
By Attorneys
Kenyon & Kenyon

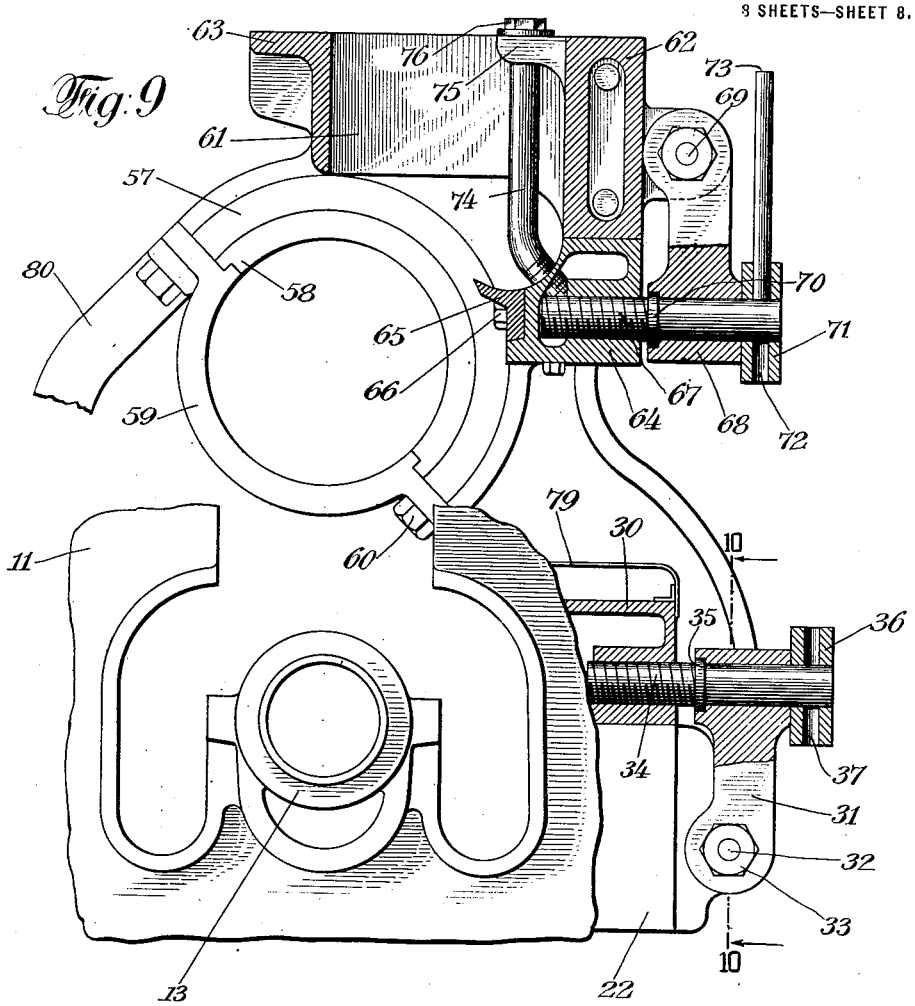
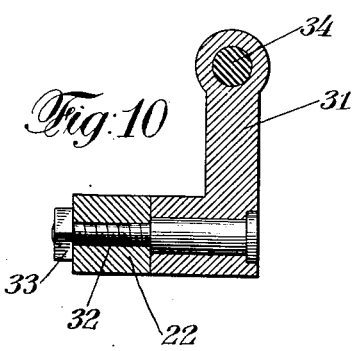

ized as follows:

UNITED STATES PATENT OFFICE.

FRANK G. PERKINS, DECEASED, LATE OF LANSDALE, PENNSYLVANIA, BY GERTRUDE S. PERKINS, EXECUTRIX, OF LANSDALE, PENNSYLVANIA, ASSIGNOR TO PERKINS GLUE CO., A CORPORATION OF PENNSYLVANIA.

GLUE-SPREADER.

1,198,655.      Specification of Letters Patent.      Patented Sept. 19, 1916.

Application filed March 13, 1911. Serial No. 614,037.

*To all whom it may concern:*

Be it known that FRANK G. PERKINS, deceased, late of Lansdale, borough of Lansdale, State of Pennsylvania, did invent certain new and useful Improvements in Glue-Spreaders, of which the following is a specification.

The invention relates to improvements in glue spreaders, or glue spreading machines, and it is specially adapted and applicable for use in connection with glue made from a vegetable base. Such a glue is described in United States applications for Letters Patent Serial No. 460,737 and Serial No. 460,738, filed November 2nd, 1908.

Various objects of the invention are to provide a machine which is simple and cheap in construction and which is economical and efficient in operation.

A further object of the invention is to provide a machine in which various parts may be easily assembled and may be easily removed for repair or replacement, and a machine in which easy access may be had to the interior thereof.

A further object of the invention is to provide means for efficiently stripping the glued material from the glue applying rolls and at the same time without interfering with the adjustability of the rolls.

A further object of the invention is to provide improved arrangements of glue troughs for the glue applying rolls, whereby they are more satisfactory in operation and construction, and also to provide an improved arrangement of scrapers for the glue applying rolls, which scrapers are carried by the glue troughs.

Further objects, features and advantages will more clearly appear from the detailed description given below, taken in connection with the accompanying drawings, which form a part of this specification.

Figure 1:
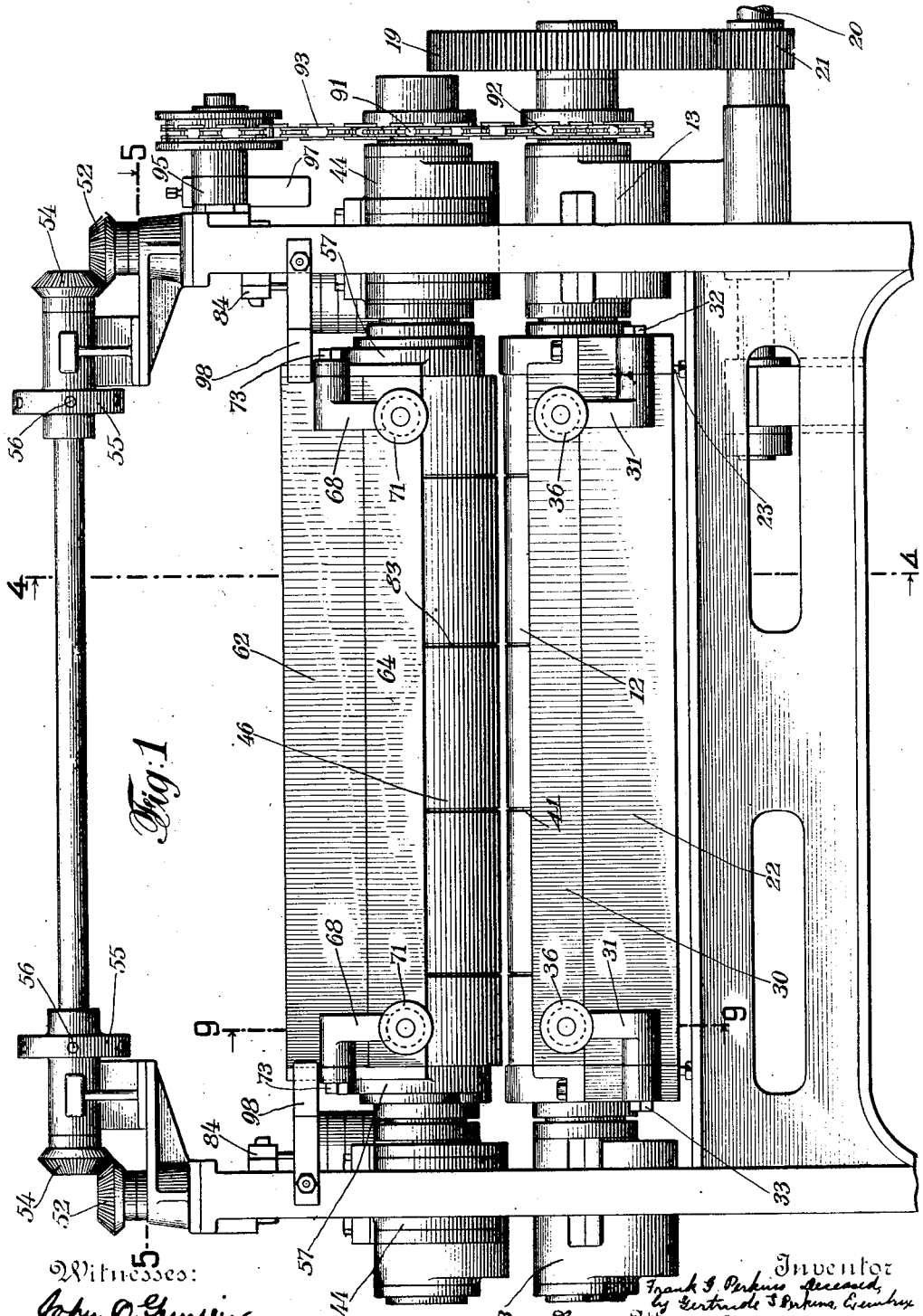
Figure 2:
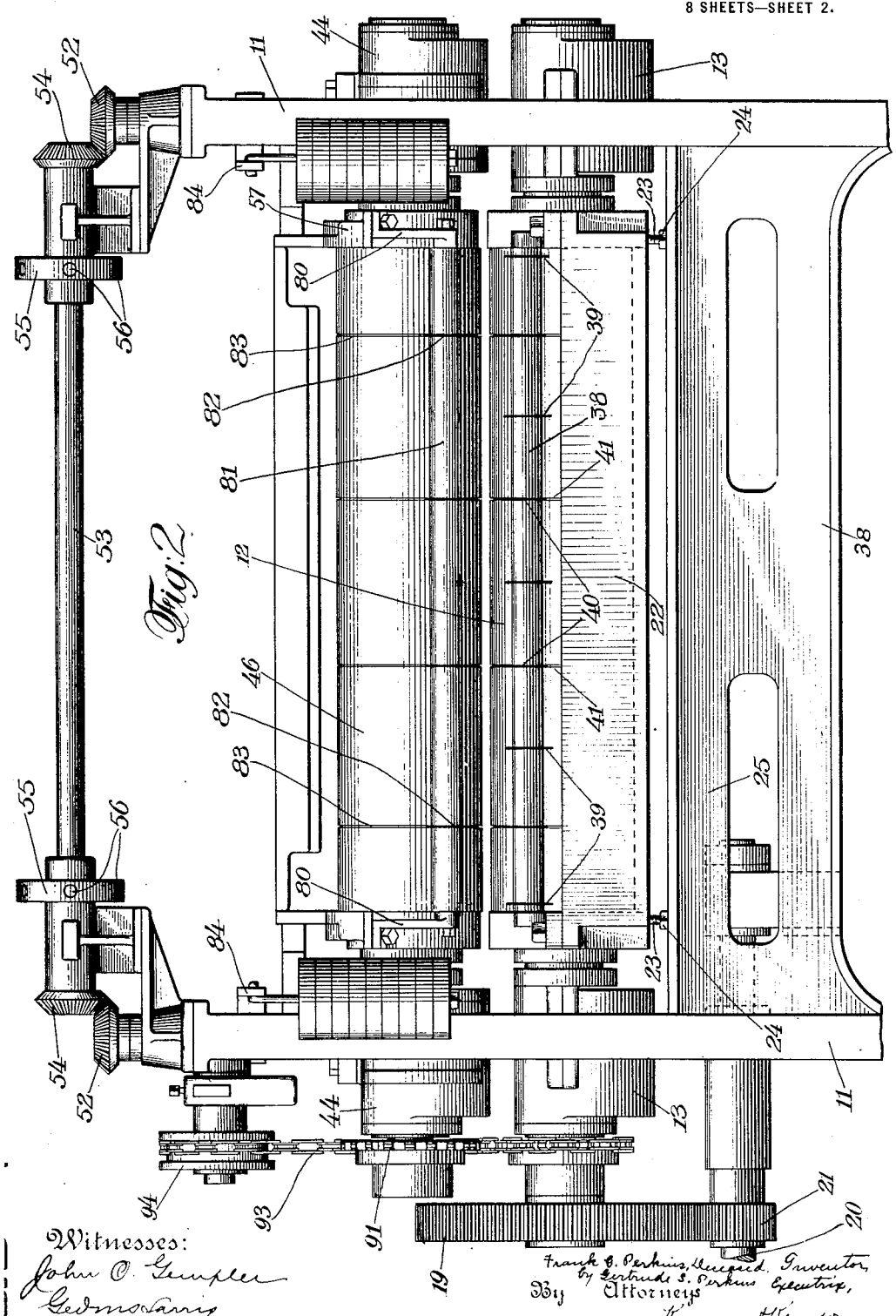
Figure 3:
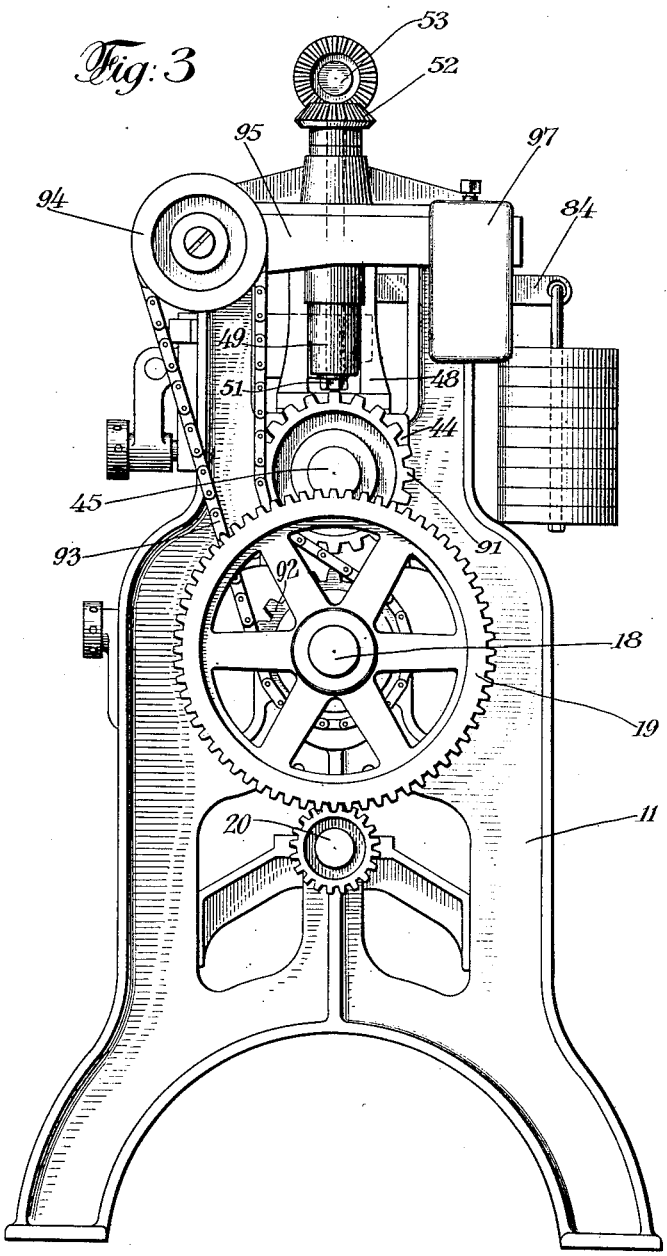
Figure 4:
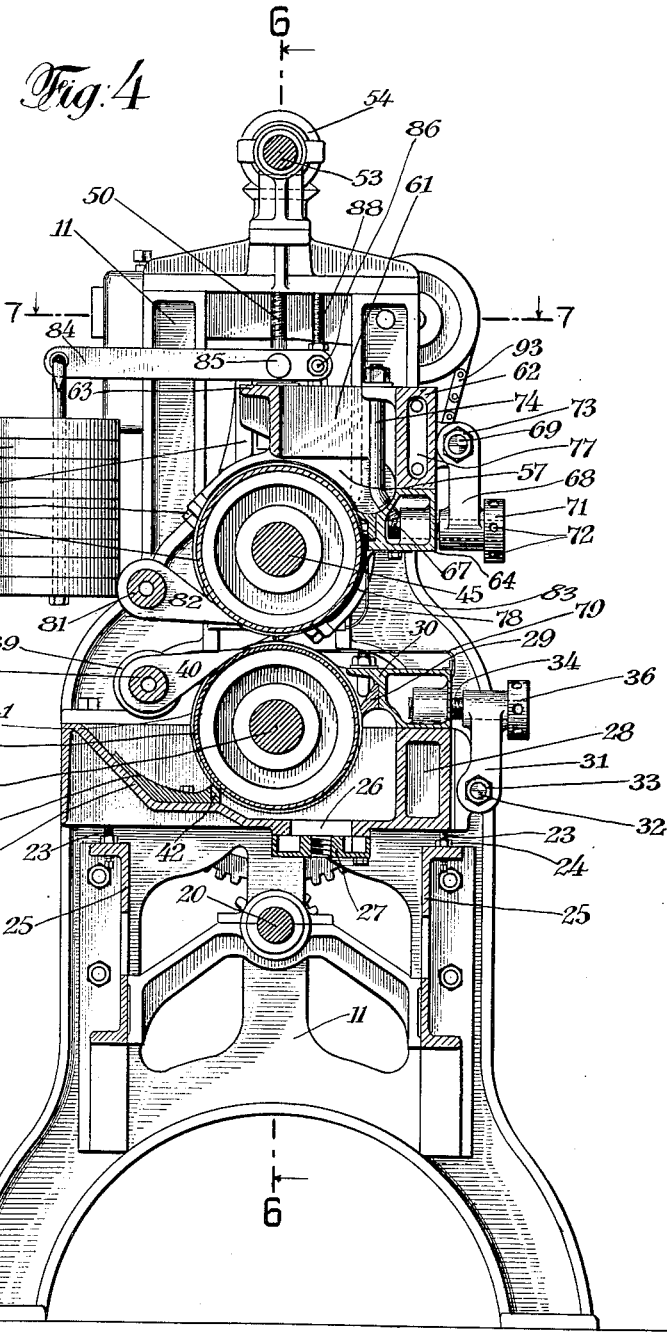
Figure 5:
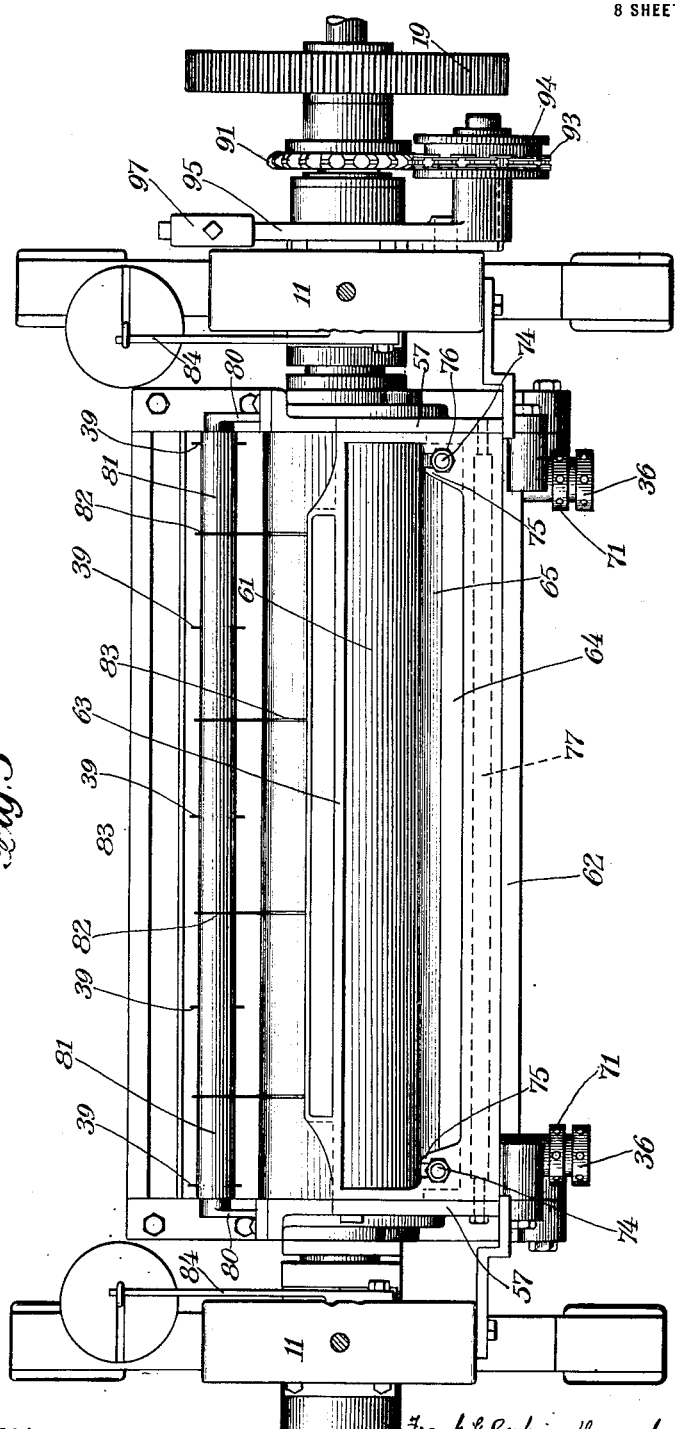
Figure 6:
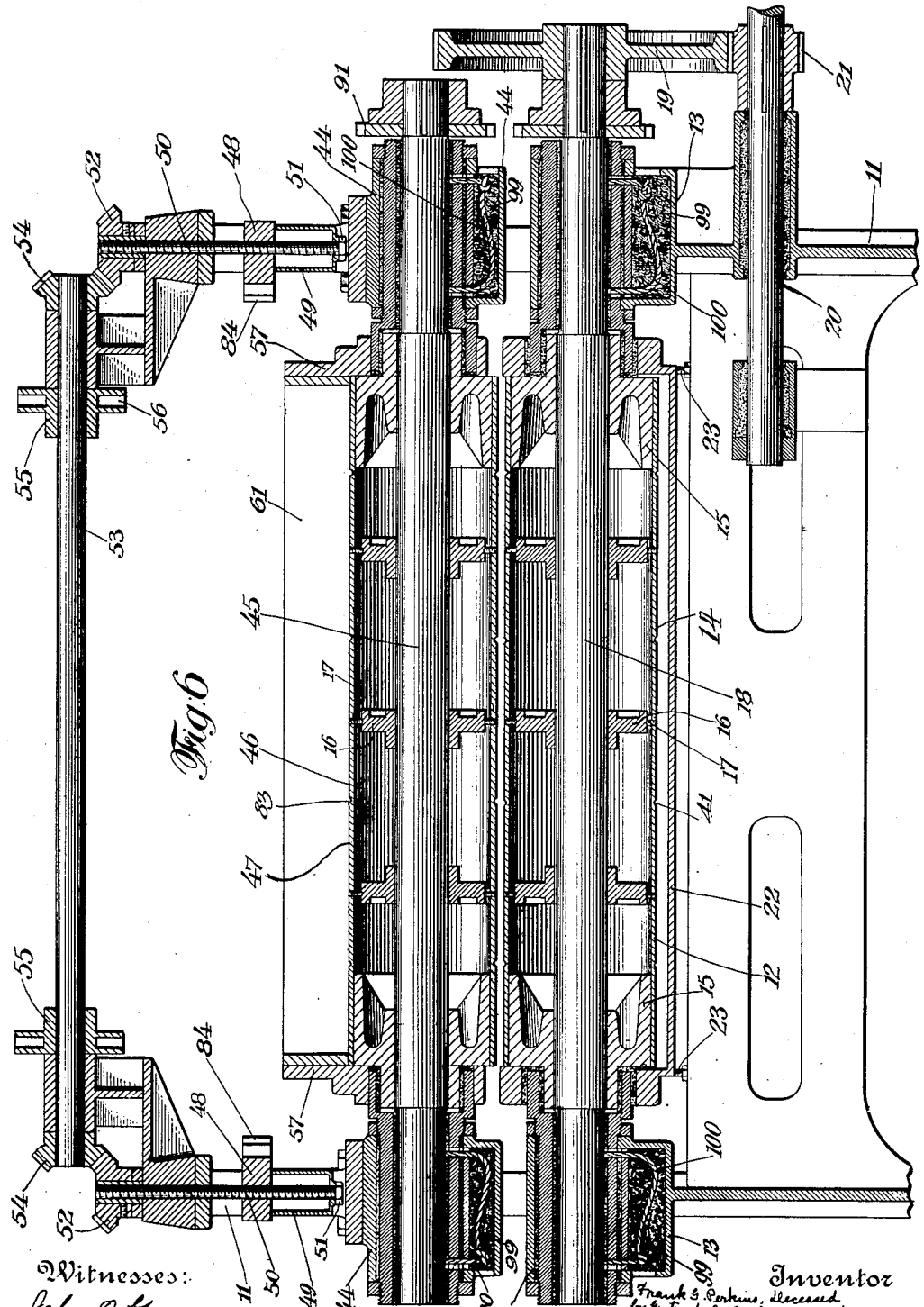
Figure 7:
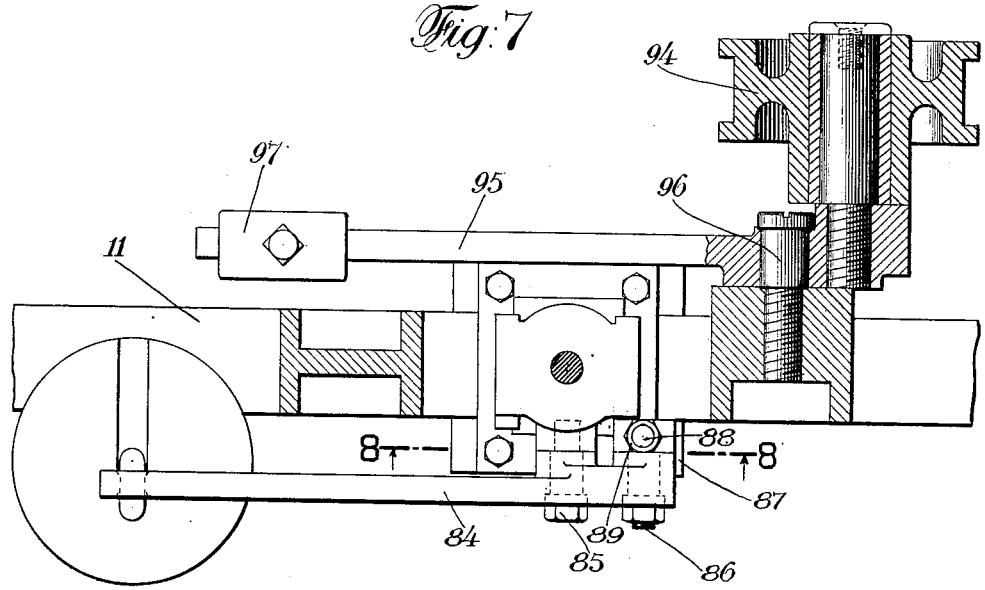
Figure 8:
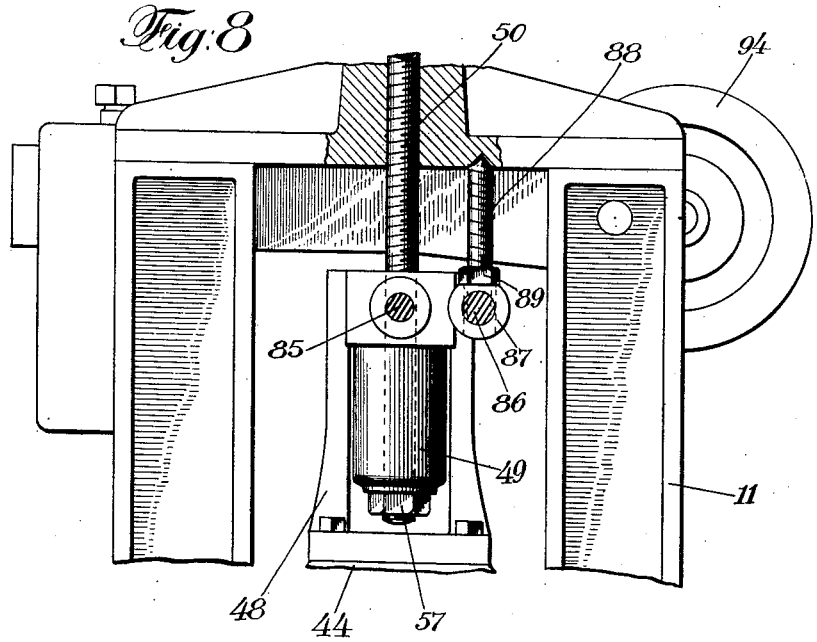

Referring to the drawings, Figure 1 is a front view of the improved machine, the lower portion of the frame being broken away. Fig. 2 is a similar view of the rear side of the machine. Fig. 3 is an end view of the machine showing the driving mechanism. Fig. 4 is a transverse vertical section taken on the line 4—4 of Fig. 1. Fig. 5 is a top plan view of the machine partly in section, taken on the line 5—5 of Fig. 1. Fig. 6 is a longitudinal vertical section taken on the line 6—6 of Fig. 4. Fig. 7 is a detail longitudinal section taken on the line 7—7 of Fig. 4. Fig. 8 is a detail section taken on the line 8—8 of Fig. 7. Fig. 9 is a detail section taken on the line 9—9 of Fig. 1. Fig. 10 is a detail section taken on the line 10—10 of Fig. 9.

Referring to the various drawings 11 represents a suitable frame carrying a lower glue roll 12 journaled in bearings 13 rigid in the frame 11. The roll 12 is formed of a metal cylinder 14 provided with disks or concentric end pieces 15 (see Fig. 6), and with intermediate bracing members or disks 16 properly spaced from the cylinder 14 by means of screws 17 which extend between the disks and the cylinder and are screw-threaded into the cylinder so that the cylinder may be adjusted and held rigid with respect to the central shaft 18. Members 15 and 16 surround and are rigidly secured to a central shaft 18 forming part of the lower glue roll. By this arrangement the roll is made light but rigid, and the outer glue applying surface can be accurately adjusted if necessary. Rigidly secured to the outer end of the shaft 18 is a gear wheel 19 for driving the same and the lower roll. Journaled in suitable bearings below the roll 12 is a driving shaft 20 carrying a gear 21 meshing with the gear 19 for the purpose of driving the lower glue roll.

Arranged below or underneath the lower glue roll 12 is a glue trough 22, as clearly shown in Figs. 1, 2 and 4. The glue trough 22 is supported by means of adjusting screws 23 with locking nuts 24 carried by members 25 bolted to the main frame 11, whereby the height of the lower glue trough 22 and its position with respect to the roll 12 may be adjusted as desired. The glue trough 22 is provided with an opening 26 in its bottom and a suitable member 27 adapted to close the opening 26. The opening 26 is for the purpose of withdrawing glue from the glue trough 22 when desired. No heating means whatever is provided on the bottom of the glue trough 22 or on that portion of the glue trough in the rear of the roll 12. However, a steam or hot water jacket 28 is provided at the front portion of the glue trough 22 for keeping the glue at the proper temperature if necessary (see Fig. 4).

For the purpose of scraping the surplus glue from the roll 22 before the glue reaches the wood or other material passing through the machine to be glued, a scraper 29 is provided. The scraper 29 is removably bolted to a member 30 slidably mounted upon the top of the glue trough 22 directly over the chamber 28 (see Fig. 4). Pivotally mounted at each end of the glue trough 22 on the front of the same is a member 31. The member 31 is pivotally mounted by means of a bolt 32 and in order to hold the member 31 rigid with the lower glue trough 22 when desired a nut 33 engages said bolt to tighten up upon the same and hold the same rigid. Each member 31 at each end of the machine carries an adjusting screw 34 (see also Figs. 9 and 10). The adjusting screw 34 engages threads within the member 30 and is prevented from longitudinal movement within the member 31 by means of a boss 35 and a capstan wheel 36 rigidly secured to its outer end. Each capstan wheel 36 is provided with openings 37 therein for the insertion of a rod to form a handle for the purpose of turning the screws 34 in order to move the members 30 and slide them back and forth so as to adjust the position of the scraper 29 toward and from the lower glue roll 12.

Carried by a shaft 38, supported by the lower glue trough 22, (see Figs. 2 and 4) are a series of disks 39. The disks 39 are for the purpose of supporting the sheet of glued wood or other material as it leaves the glue applying rolls. Also carried by the shaft 38 is a plurality of sheet metal or thin pointed members 40, which members have their pointed ends sitting or lying in circumferential grooves 41 in the lower glue roll 12. In this manner if there is any tendency for the glued material to follow the surface of the lower glue roll in its circumferential travel the members or strippers 40 will engage the underside of the glued material and direct the glued material outwardly as desired. This feature is made most efficient because the pointed ends of the strippers 40 lie or sit within the grooves 41, thereby making the sticking of the glued material to the lower glue roll practically impossible.

Extending upwardly from the bottom of the lower glue trough 22 there is provided a plurality of lugs 42 preferably arranged about 12 inches apart. These lugs are spaced lengthwise along the bottom of the glue trough and extend upwardly to a point adjacent to the surface of the glue roll 12; these lugs prevent foreign matter attaching to the glue roll 12 from passing downwardly and underneath the glue roll. Extending backwardly from the lugs 42 are ridges 43, which enable any foreign material to be more easily removed from the lower glue trough.

Sliding in the upper portion of the frame 11 are bearings 44. In the bearings 44 are journaled the ends of the central shaft 45 of the upper glue roll 46. The upper glue roll 46 comprises a cylindrical outside member 47 supported upon the shaft 45 and made up in the same manner as the lower glue roll 12, as clearly shown in Fig. 6. Secured to the bearings 44 at each end of the machine are stirrups 48, each of which is designed to slide vertically in suitable guideways in the frame of the machine, as will be clearly understood. Engaging the stirrups 48 are cup-shaped members 49 and passing through stirrups 48 are lifting screws 50. The screws 50 are provided with nuts 51 at their lower ends and below the cup-shaped members 49, which nuts securely hold the members 49 and stirrups 48 so that they are supported by the lifting screws 50. The lifting screws 50 pass upwardly through the top of the frame work where they are engaged by beveled gears 52. The beveled gears 52 are screw-threaded upon the lifting screws 50, so that upon turning the gears 52 the lifting screws 50 are moved upwardly or downwardly, at the same time carrying the stirrups 48, the bearings 44, and the upper glue roll 47. For the purpose of rotating the gears 52 as described there is journaled at the top of the machine a shaft 53, having rigidly secured at each end thereof a beveled gear 54, which gear engages its corresponding gear 52. Also rigidly secured to the shaft 53 are capstan wheels 55 provided with apertures 56 in which a rod may be inserted to form a handle for the purpose of turning the wheels to adjust the position of the upper glue roll with respect to the lower glue roll, as will be clearly understood.

Bolted about the bearings 44 adjacent to the ends of the glue roll 46 are members or end pieces 57, more clearly shown in detail in Fig. 9. The end pieces 57 are made up of two parts, 58 and 59, bolted together and about the bearing members 44 by means of bolts 60. These end pieces 57 form the ends or portions of the ends of a glue trough 61 for holding glue into which the upper roll 46 dips. The upper glue trough 61 also comprises a front member 62 and a rear member 63 rigid or integral with one another and both secured to the end pieces 57 by means of bolts, or in any other suitable manner. The glue trough 61 sits above the axis of the upper glue roll 60 and on the front side of the same. To provide for the bottom of the glue trough there is a member 64, as clearly shown in the Figs. 4 and 9, which member is slidably mounted on the underneath side of the front 62 of the glue trough. The member 64 carries on its inner extremity a scraper 65 for the upper glue roll, which scraper is removably secured to the member 64 by means of bolts 66. In order to adjust the position of the scraper 65 toward and from the upper glue roll, there is provided at each end of the machine an adjusting screw 67 journaled in a swinging member 68, which swinging member 68 is pivotally mounted upon the back 62 of the upper glue trough by means of a bolt 69. By tightening the nut 73 the swinging member 68 may be adjusted and rigidly held in any position desired with respect to the body of the upper glue trough or the upper roll bearings. The adjusting screw 67 is kept from longitudinal movement within the member 68 by means of a boss 70 and a capstan wheel 71. The capstan wheel 71 is rigidly secured to the screw 67 and is provided with openings 72 into which a rod or handle may be inserted for the purpose of turning the capstan wheel to operate the screw 67 and thereby move the member 64 with its scrapers 65 toward and from the upper glue roll as desired. As shown in Fig. 1 a similar arrangement of adjusting screw, capstan wheel, &c. is provided at each end of the machine. For the purpose of holding the bottom member 64 with its scraper 65 rigid when in its desired position, there is provided at each end of the opening a bolt 74 solidly screwed into the member 64 and passing upwardly and engaging lugs 75 upon the back wall 62 of the trough 61. Nuts 76 engage the upper ends of the bolts 74 adjacent to lugs 75, so that upon the tightening of the nuts 76 the member 64 may be drawn upwardly and held rigidly in position.

The back portion 62 of the upper trough 61 is provided with a space 77 into which steam or hot water may be admitted for the purpose of keeping the glue warm within the upper trough if necessary.

Arranged at the front of the machine and secured to the members 30 and 64 are guiding strips 78 and 79 (see Fig. 4) for the purpose of guiding the wood or other material into the machine.

Secured to the end pieces 57 at the upper roll are arms 80 which extend downwardly and to the left, as shown in Fig. 9, and which carry at their lower extremities a supporting rod 81. Secured to the rod 81 at suitable intervals are thin metallic stripping members 82 similar to the members 40. The strippers 82 are also arranged to lie and sit within grooves 83 in the upper glue roll and operate in substantially the same manner as described with respect to the strippers 40. The members 82 and 40 are situated on the same side of the glue rolls with their points lying close to the common tangent of the rolls when the rolls are brought together. It will, therefore, be seen that the bearings 44 support not only the upper glue roll 46, but also its strippers, its glue applying trough and its scraper, as well as its guiding member 78 and also the adjusting mechanism for adjusting the position of the scraper 65. In this manner whenever the space between the two glue rolls is adjusted it does not necessitate the adjusting of all the other various parts coöperating therewith.

In order that there may be sufficient pressure exerted by the upper glue roll when it is let down upon the wood or other material to be glued, there are provided levers 84, one at each end of the machine, which levers are pivotally mounted to the stirrups 48 as at 85 (see Fig. 4). The arms or levers 84 are fulcrumed at 86 by being bolted to a member 87, which is kept stationary and prevented from moving upwardly by means of a screw 88 engaging the underneath side of the top frame of the machine, (see also Figs. 7 and 8). By adjusting the position of the nut 89 upon the screw 88 the fulcrum point of the lever 84 may be adjusted vertically. Suspended to the outer end of the lever is an adjustable weight comprising a plurality of weights 90. The adjustable weight or weights 90, therefore, tend to force down the stirrups 48 and thereby tend to force downwardly the upper glue roll 46, so as to exert the proper pressure upon the material being glued.

For the purpose of driving the upper glue roll, its central shaft 45 is provided on its outer end with a sprocket wheel 91, rigidly secured thereto. Rigidly secured to the shaft 18 of the lower glue roll is a sprocket wheel 92 and over these sprocket wheels there passes a sprocket chain 93 for the purpose of driving the same. In order to keep the sprocket chain taut and make it unnecessary that separate adjustments be made in the sprocket chain, whenever the position of the upper roll is moved or adjusted there is provided an idler 94 over which the sprocket chain 93 passes. The idler 94 is arranged considerably above both of the sprockets 91 and 92 and their glue rolls and is journaled upon the short arm of a lever 95, which lever is pivotally connected to the main frame as at 96 (see Fig. 7.) Connected to the long arm of the lever 95 is a counter weight 97, so that the counterweight 97 tends to force the idler 94 upwardly, and thereby keep the sprocket chain taut. By arranging the idler 94 considerably above the two sprocket wheels 91 and 92 very little movement of the idler 94 is required to accommodate a very considerable movement or adjustment of the upper glue roll.

In order to prevent the upper glue trough and its connecting parts from turning with the upper glue roll, I provide bracing strips 98 bolted to the main frame and extending inwardly so as to engage the front side 62 of the glue trough (see Fig. 1). The members 57 forming the end portions of the glue trough are arranged to abut closely against the ends of the upper roll 46, so as to prevent glue from flowing out between the ends of the roll and the ends of the glue trough.

Referring to Fig. 6, the bearings 44 and 13 are provided with spaces 99 below each bearing, which spaces are adapted to contain oil and waste for the purpose of lubrication. Passing through the spaces 99 and the waste and oil therein, are wicks or wicking 100, which wicking also passes through the bearing members 44 and 13 and contacts with the bearing part of the shafts 45 and 18, for the purpose of lubrication.

In operation, the material to be glued is fed in at the front side of the machine, that is, at the right hand side as shown in Fig. 4, and upon the driving of the shaft 20 the upper and lower glue rolls are driven, taking up glue from their respective glue troughs and applying this glue to the wood or the material being fed through the machine, as will be clearly understood.

From the above it will appear that the machine is especially efficient and that the various parts may be easily removed and repaired. The arrangement shown and described is especially advantageous since the various glue troughs are made up of separable sections, so that various parts of the apparatus may be easily accessible for investigation, repair, etc. The machine, as will clearly appear, is also especially applicable for extremely heavy work and for applying a glue which is somewhat more viscous than many glues.

Although the improvements have been described in great detail, nevertheless, it is not desired that the invention be limited to such details, except as clearly pointed out in the appended claims.

Having thus fully and clearly described the improvements and the apparatus embodying the same, what is claimed as new and desired to be secured by Letters Patent, is:

1. In a glue spreader, a suitable frame, a lower glue roll journaled in said frame, an upper glue roll, bearings for said upper roll, said bearings being movable up and down, said glue rolls having circumferential grooves in the surfaces, pointed strippers entering said grooves to strip the material being glued from the rolls, means rigid with said bearings for carrying the strippers for the upper glue roll, means for adjusting the height of the lower glue trough, a sprocket wheel rigid with each roll for driving the same, a sprocket chain running over said wheels, a movable idler for said chain, a counterweight for holding said idler in position, a glue trough for the upper roll and made rigid with the bearings for the upper roll, a removable scraper secured to the upper trough, means for adjusting the position of said scraper toward and from the upper roll, means for heating the glue in each trough, said upper trough having independently removable end pieces and said scraper being adjustable independently of said end pieces.

2. In a glue spreader, a suitable frame, a lower glue roll journaled in said frame, an upper glue roll, bearings for said upper roll, said bearings being movable up and down, said glue rolls having circumferential grooves in the surfaces, pointed strippers entering said grooves to strip the material being glued from the rolls, means rigid with said bearings for carrying the strippers rigidly with respect to the bearings for the upper glue roll, a sprocket wheel rigid with each roll for driving the same, a sprocket chain running over said wheels, a glue trough for the upper roll and made rigid with the bearings for the upper roll, a removable scraper secured to the upper trough, means for adjusting the position of said scraper toward and from the upper roll, said upper trough having independently removable end pieces and said scraper being adjustable independently of said end pieces.

3. In a glue spreader, a suitable frame, a lower glue roll journaled in said frame, an upper glue roll, bearings for said upper roll, said bearings being movable up and down, said glue rolls having circumferential grooves in the surfaces, pointed strippers entering said grooves to strip the material being glued from the rolls, means rigid with said bearings for carrying the strippers rigidly with respect to said bearings for the upper glue roll, a sprocket wheel rigid with each roll for driving the same, a sprocket chain running over said wheels, a glue trough for the upper roll and made rigid with the bearings for the upper roll, a scraper secured to the upper trough, and means for adjusting the position of said scraper toward and from the upper roll.

4. In a glue spreader, a suitable frame, a lower glue roll journaled in said frame, an upper glue roll, bearings for said upper roll, said bearings being movable up and down, said glue rolls having circumferential grooves in the surfaces, pointed strippers entering said grooves to strip the material being glued from the rolls, means rigid with said bearings for carrying the strippers for the upper glue roll, a sprocket wheel rigid with each roll for driving the same, a sprocket chain running over said wheels, a movable idler for said chain, a counterweight for holding said idler in position, a glue trough for the upper roll and made rigid with the bearings for the upper roll, a scraper secured to the upper trough, and means for adjusting the position of said scraper toward and from the upper roll.

5. In a glue spreader, upper and lower glue applying rolls, movable bearings for one of said rolls, means for moving said bearings whereby the space between said rolls may be adjusted, pointed members lying adjacent the periphery of the lower roll for stripping the glued material therefrom, pointed members situated on the same side of the glue rolls as said first mentioned pointed members and lying adjacent the periphery of the upper glue roll for stripping the glued material therefrom, said rolls each having circumferential grooves in which the points of said pointed members are set with the points of said pointed members lying close to the common tangent of the rolls when the rolls are brought together, and means whereby the stripping members for the movable glue roll are carried rigidly with the movable bearings thereof.

6. In a glue spreader, upper and lower glue applying rolls, movable bearings for said upper roll, means whereby said bearings may be moved to adjust the space between said rolls, a glue trough for each glue roll, pointed members lying adjacent the periphery of the lower roll for stripping the glued material therefrom, pointed members situated on the same side of the glue rolls as said first mentioned pointed members and lying adjacent the periphery of the upper glue roll for stripping the glued material therefrom, said rolls each having circumferential grooves in which the points of said pointed members are set with the points of said pointed members lying close to the common tangent of the two rolls when the rolls are brought together.

7. In a glue spreader, a suitable frame, a lower glue applying roll, a trough below said roll for applying glue thereto, an upper glue roll having movable bearings in said frame, means for moving said bearings up and down to adjust the position of the upper roll with respect to the lower roll, strippers for the lower roll, and strippers for the upper roll carried rigid with said bearings, said strippers having points lying close to the common tangent of the rolls when the rolls are brought together.

8. In a glue spreader, a main frame, a lower glue applying roll journaled in said frame, an upper glue applying roll adjustable toward and from the lower roll, a sprocket wheel secured to each roll for driving the same, a sprocket chain passing over said wheels, a movable idler above both of said wheels and over which said chain passes, a counterweight for said idler whereby said chain is kept taut, and a pivoted arm on one end of which said counterweight is carried and on the other end of which said idler is carried.

9. In a glue spreader, a main frame, a lower glue roll journaled in said frame, an upper glue roll, adjustable movable bearings for said upper roll whereby the distance between the two rolls may be adjusted, a glue supplying trough for the upper roll held rigid with said bearings, and a bottom for said trough movable relatively to the rest of the trough, said bottom carrying a removable scraper for the upper roll.

10. In a glue spreader, a main frame, a lower glue roll journaled in said frame, an upper glue roll, adjustable movable bearings for said upper roll whereby the distance between the two rolls may be adjusted, a glue supplying trough for the upper roll held rigid with said bearings, a bottom for said trough movable relatively to the rest of the trough, said bottom carrying a scraper for the upper roll, said scraper being removable with respect to said bottom, and an adjusting screw for adjusting the position of said bottom and scraper with respect to the roll while the rest of the trough is stationary.

11. In a glue spreader, a main frame, a glue applying roll journaled in said frame, an upper roll, between which two rolls the material to be glued is adapted to pass, a trough below said glue applying roll for holding glue into which the roll dips, and a plurality of lugs or projections extending upwardly from the bottom of said trough to a point near the periphery of the glue roll, to prevent foreign matter getting under the roll.

12. In a glue spreader, a main frame, a glue applying roll journaled in said frame, an upper roll, between which two rolls the material to be glued is adapted to pass, a trough below said glue applying roll for holding glue into which the roll dips, a plurality of lugs or projections extending upwardly from the bottom of to a point near the periphery of the glue roll, to prevent foreign matter getting under the roll, and a plurality of ribs extending upwardly from the bottom of said trough and extending in a direction away from said glue roll.

13. In a glue spreader, a frame, a glue applying roll journaled in said frame, a glue trough adjacent said roll for holding glue into which the roll dips, a member movable relatively to said trough, a scraper for the roll carried by said member, a swinging member pivotally mounted with respect to said trough, and an adjusting screw carried by said pivotally mounted member whereby when the screw is operated the scraper is moved toward or away from said roll.

14. In a glue spreader, a frame, a glue applying roll journaled in said frame, a glue trough adjacent said roll for holding glue into which the roll dips, a member movable relatively to said trough, a scraper for the roll carried by said member, a swinging member pivotally mounted to the trough at each end of the machine, and an adjusting screw carried by each pivoted member whereby when the screws are operated the scraper is moved toward or away from the roll.

15. In a glue spreader, a frame, a glue applying roll journaled in said frame, a glue trough adjacent said roll for holding glue into which the roll dips, a member movable relatively to said trough, a scraper for the roll carried by said member, a swinging member pivotally mounted with respect to said trough, an adjusting screw carried by said pivotally mounted member whereby when the screw is operated the scraper is moved toward or away from said roll, and means for rendering said pivotally mounted member rigid with the trough.

16. In a glue spreader, a frame, a glue applying roll journaled in said frame, a glue trough adjacent said roll for holding glue into which the roll dips, a member movable relatively to said trough, a scraper for the roll carried by said member, a swinging member pivotally mounted to the trough at each end of the machine, an adjusting screw carried by each pivoted member whereby when the screws are operated the scraper is moved toward or away from the roll, and means for rendering said pivotally mounted members rigid with the trough, said scraper being removably secured to said first mentioned movable member.

17. In a glue spreader, a frame, a glue applying roll journaled in said frame, a glue trough adjacent said roll for holding glue into which the roll dips, an opening in the bottom of said trough for withdrawing glue therefrom, and means at the side of the trough for heating the glue therein, said trough being free from heating means about said opening and on the exit side of the glue applying roll.

18. In a glue spreader, a main frame, a lower glue applying roll journaled in said frame, an adjustable upper glue roll, between which rolls the material to be glued passes, bearings for the upper roll, said bearings being slidably mounted to move up and down in said frame, glue troughs for carrying glue into which the upper and lower rolls dip, a sprocket wheel secured to the lower roll, a sprocket wheel secured to the upper roll, a pivotally mounted idler above the upper roll, a sprocket chain passing over said wheels and idler to drive the upper roll, a gear also secured to the lower roll, a driving shaft journaled in said frame, a gear secured to said shaft and meshing with the first mentioned gear to drive the lower roll, and a counterweight for said idler to keep the sprocket chain taut.

19. In a glue spreader, a frame, bearings in said frame, a glue applying roll journaled in said bearings, a glue trough adjacent said roll for holding glue into which the roll dips, said trough having end pieces rigidly secured to said bearings and closely abutting the ends of the roll, the body portion of said trough being rigidly fixed to said end pieces but removable therefrom, and said trough having a bottom movable with respect to the body portion and carrying a removable scraper for the roll.

20. In a glue spreader, a frame, a lower roll journaled in said frame, movable bearings in said frame, an upper glue roll journaled in said movable bearings, a glue trough adjacent said upper roll for holding glue into which the upper roll dips, said trough having end portions adjacent the periphery of the upper roll removably secured to the rest of the trough.

21. In a glue spreader, a frame, a lower roll journaled in said frame, movable bearings in said frame, an upper glue roll journaled in said movable bearings, a glue trough adjacent said upper roll for holding glue into which the upper roll dips, said trough having end portions adjacent the periphery of the upper roll and removably secured to the rest of the trough, said end portions being rigidly secured to the upper roll bearings and the front and back of said trough being rigidly secured to said end portions.

22. In a glue spreader, a frame, a lower roll journaled in said frame, movable bearings in said frame, an upper glue roll journaled in said movable bearings, a glue trough adjacent said upper roll for holding glue into which the upper roll dips, said trough having end portions adjacent the periphery of the upper roll and removably secured to the rest of the trough, said end portions being rigidly secured to the upper roll bearings and the front and back of said trough being rigidly secured to said end portions, and said trough having a bottom member carrying a scraper for the upper roll, said scraper being movable with respect to the end portions, back and front of the trough whereby it may be adjusted at different distances from the upper roll.

23. In a glue spreader, a frame, a lower roll journaled in said frame, movable bearings in said frame, an upper glue roll journaled in said movable bearings, a glue trough adjacent said upper roll for holding glue into which the upper roll dips, said trough having end portions adjacent the periphery of the upper roll removably secured to the rest of the trough, said end portions being rigidly secured to the upper roll bearings and the front and back of said trough being rigidly secured to said end portions, and said trough having a bottom member carrying a scraper for the upper roll, said scraper being movable with respect to the end portions, back and front of the trough whereby it may be adjusted at different distances from the upper roll, and a member pivoted to swing on said trough at each end of the trough, and an adjusting screw carried by each member for moving said bottom portion to adjust the position of the scraper with respect to said upper roll.

24. In a glue spreader, upper and lower glue applying rolls for applying glue to the material to be operated upon, each roll comprising a metallic hollow cylinder, a central shaft, and a plurality of bracing members spaced along said shaft to properly hold and position the cylinder with respect to the shaft.

25. In a glue spreader, upper and lower glue applying rolls for applying glue to the material to be operated upon, each roll comprising a metallic hollow cylinder, a central shaft, a plurality of bracing members spaced along said shaft, and a plurality of screws extending between each bracing member and the cylinder to properly hold and position the cylinder with respect to the shaft.

26. In a glue spreader, a roll for applying glue to the material to be operated upon, said roll comprising a metallic hollow cylinder grooved on the outside the outer surface of which applies the glue, and a central shaft carrying means at various points along the shaft for bracing the cylinder to properly hold and position the cylinder with respect to the shaft.

27. In a glue spreader, a roll for applying glue to the material to be operated upon, said roll comprising a metallic hollow cylinder the outer surface of which is provided with grooves and which applies the glue, and means for bracing said cylinder internally at a plurality of points, whereby the roll is made light but rigid.

28. In a glue spreader, a roll for applying glue to the material to be operated upon, said roll comprising a metallic hollow cylinder the outer surface of which applies the glue, and means for bracing said cylinder internally at the ends and a plurality of intermediate points, whereby the roll is made light but rigid.

29. In a glue spreader, a roll for applying glue to the material to be operated upon, said roll comprising a metallic hollow cylinder the outer surface of which applies the glue, and means for bracing said cylinder internally at the ends and a plurality of intermediate points, whereby the roll is made light but rigid, said means embracing a central shaft and a plurality of disks carried by said shaft at various points along the length of the cylinder.

30. In a glue spreader, a roll for applying glue to the material to be operated upon, said roll comprising a metallic hollow cylinder the outer surface of which applies the glue, and a central shaft carrying means at various points for bracing the cylinder to properly hold and position the cylinder with respect to the shaft, said means embracing a central shaft and a plurality of disks carried by said shaft at various points along the length of the cylinder.

31. In a glue spreader, upper and lower glue applying rolls, said rolls embracing hollow metallic cylinders, the outer surface of which cylinders applies the glue, and means for making the cylinders rigid.

32. In a glue spreader, a roll for applying glue to the material to be operated upon, said roll comprising a metallic hollow cylinder the outer surface of which applies the glue, a central shaft carrying means at various points for bracing the cylinder to properly hold and position the cylinder with respect to the shaft, said means embracing a central shaft and a plurality of disks carried by said shaft at various points along the length of the cylinder, and a plurality of screws for each disk extending between the disk and the cylinder for adjusting the surface of the cylinder with respect to the disk and central shaft.

In testimony whereof, I have signed my name to this specification in the presence of two subscribing witnesses.

GERTRUDE S. PERKINS,
*Executrix of the last will and testament of Frank G. Perkins, deceased.*

Witnesses:
  L. McMillen,
  Chas. L. Zigler.